(12) United States Patent
Baird et al.

(10) Patent No.: US 8,295,202 B2
(45) Date of Patent: *Oct. 23, 2012

(54) DYNAMIC CONNECTIVITY DETERMINATION

(75) Inventors: Brian Baird, San Ramon, CA (US);
Daniel Talayco, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/684,676

(22) Filed: Jan. 8, 2010

(65) Prior Publication Data

US 2010/0115032 A1     May 6, 2010

Related U.S. Application Data

(63) Continuation of application No. 11/099,539, filed on Apr. 6, 2005, now Pat. No. 7,720,001.

(51) Int. Cl.
*H04L 12/28* (2006.01)
(52) U.S. Cl. ........................................ 370/254; 709/205
(58) Field of Classification Search .................. 370/254; 709/205
See application file for complete search history.

(56) References Cited

U.S. PATENT DOCUMENTS

| | | | |
|---|---|---|---|
| 5,825,772 A | | 10/1998 | Dobbins et al. |
| 5,933,412 A | * | 8/1999 | Choudhury et al. .......... 370/218 |
| 6,104,696 A | | 8/2000 | Kadambi et al. |
| 6,954,437 B1 | | 10/2005 | Sylvest et al. |
| 6,977,908 B2 | * | 12/2005 | de Azevedo et al. .......... 370/254 |
| 7,720,001 B2 | * | 5/2010 | Baird et al. .................... 370/253 |
| 2004/0081169 A1 | | 4/2004 | Kloth et al. |
| 2005/0047350 A1 | | 3/2005 | Kantor et al. |
| 2005/0169193 A1 | * | 8/2005 | Black et al. .................... 370/254 |
| 2006/0227715 A1 | | 10/2006 | Baird et al. |

OTHER PUBLICATIONS

Office Action received for U.S. Appl. No. 11/099,539, mailed on Mar. 27, 2008, 17 pages.
Response to Office Action received for U.S. Appl. No. 11/099,539, filed May 27, 2008, 13 pages.
Office Action received for U.S. Appl. No. 11/099,539, mailed on Aug. 29, 2008, 11 pages.
Response to Office Action received for U.S. Appl. No. 11/099,539, filed Oct. 29, 2008, 16 pages.
Office Action received for U.S. Appl. No. 11/099,539, mailed on Feb. 9, 2009, 13 pages.
Response to Office Action received for U.S. Appl. No. 11/099,539, filed Jul. 9, 2009, 15 pages.
Notice of Allowance received for U.S. Appl. No. 11/099,539, mailed on Oct. 5, 2009, 7 pages.

* cited by examiner

*Primary Examiner* — Robert Wilson
*Assistant Examiner* — Wei Zhao

(57) ABSTRACT

Methods and network device apparatus for discovering interconnections between a plurality of network devices are disclosed. An example network device apparatus includes a first stack port configured to couple the network device with a next network device and a second stack port configured to couple the network device with a previous network device. The example network device is configured to send, to the next network device through the first stack port, a first probe packet and a routing packet. The example network device is further configured to receive, from the previous network device through the second stack port, a second probe packet and the routing packet. The example network device is still further configured to confirm that the previous network device and the next network device have received configuration information included in the routing packet.

20 Claims, 5 Drawing Sheets

DYNAMIC CONNECTIVITY DETERMINATION

CROSS REFERENCE TO RELATED APPLICATIONS

This application claims priority under 35 U.S.C. §120 as a continuation application of U.S. patent application Ser. No. 11/099,539, filed on Apr. 6, 2005, now U.S. Pat. No. 7,720, 001. The disclosure of U.S. patent application Ser. No. 11/099,539 is incorporated by reference herein in its entirety.

BACKGROUND OF THE INVENTION

1. Field of the Invention

The invention relates to a method and apparatus for high performance switching in local area communications networks such as token ring, ATM, and Ethernet environments, generally known as LANs. In particular, the invention relates to a method and apparatus for discovering the topology of a network.

2. Description of the Related Art

Computer networks are commonly used to send and receive data, to share resources, and to provide communication between remote users. As computer performance has increased in recent years, the demands on computer networks has also significantly increased; faster computer processors and higher memory capabilities require networks with high bandwidth capabilities to enable high speed transfer of significant amounts of data. Based upon the Open Systems Interconnect (OSI) 7-layer reference model, network capabilities have grown through the development of devices such as repeaters, bridges, routers, and switches, which operate with various types of communication media. Thickwire, thinwire, twisted pair, and optical fiber are examples of media which has been used for computer networks. The devices may be interconnected by a high speed local data link such as a local area network (LAN), token ring, Ethernet, etc.

Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to as wirespeed or linespeed, which is the maximum speed capability of the particular network.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network. The spanning tree algorithm defines a protocol for preventing data loops. Layer three switches, sometimes referred to as routers, can forward packets based upon the destination network address. Layer three switches are capable of learning addresses, maintaining tables thereof which correspond to port mappings, and changing packet data in the process. Processing speed for layer three switches can be improved by utilizing specialized high performance hardware, and off loading the host CPU so that instruction decisions do not delay packet forwarding.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

The present invention provides, in one embodiment, a system of interconnected network devices. The network devices convey data across dedicated connections referred to as "stack ports." This configuration will be referred to as a "stack" of network devices, although the physical organization may be a chassis or be highly dispersed. The stack of network devices acts as a single logical network switch with a larger load capacity. Connecting the network devices in a stacked configuration results in the need for discovering what the components of the system are and whether they can communicate with each other. The system should be configured in a manner which allows each of the individual components to communicate with the other components. Therefore, the present invention provides a method and apparatus for dynamic discovery and configuration of network devices in a stacked arrangement.

The network devices of the present invention may be network components with switching and computational capabilities. Additionally, the network devices may be network hardware components capable of generating, receiving and processing packets as will be discussed below. The network devices may have switching and/or routing capabilities appropriate to a local area network (LAN) or other communication network. Furthermore, each of the network devices may include a CPU or CPU functionality, or, alternatively, may be in communication with an external CPU via a CPU interface.

Figure 1:
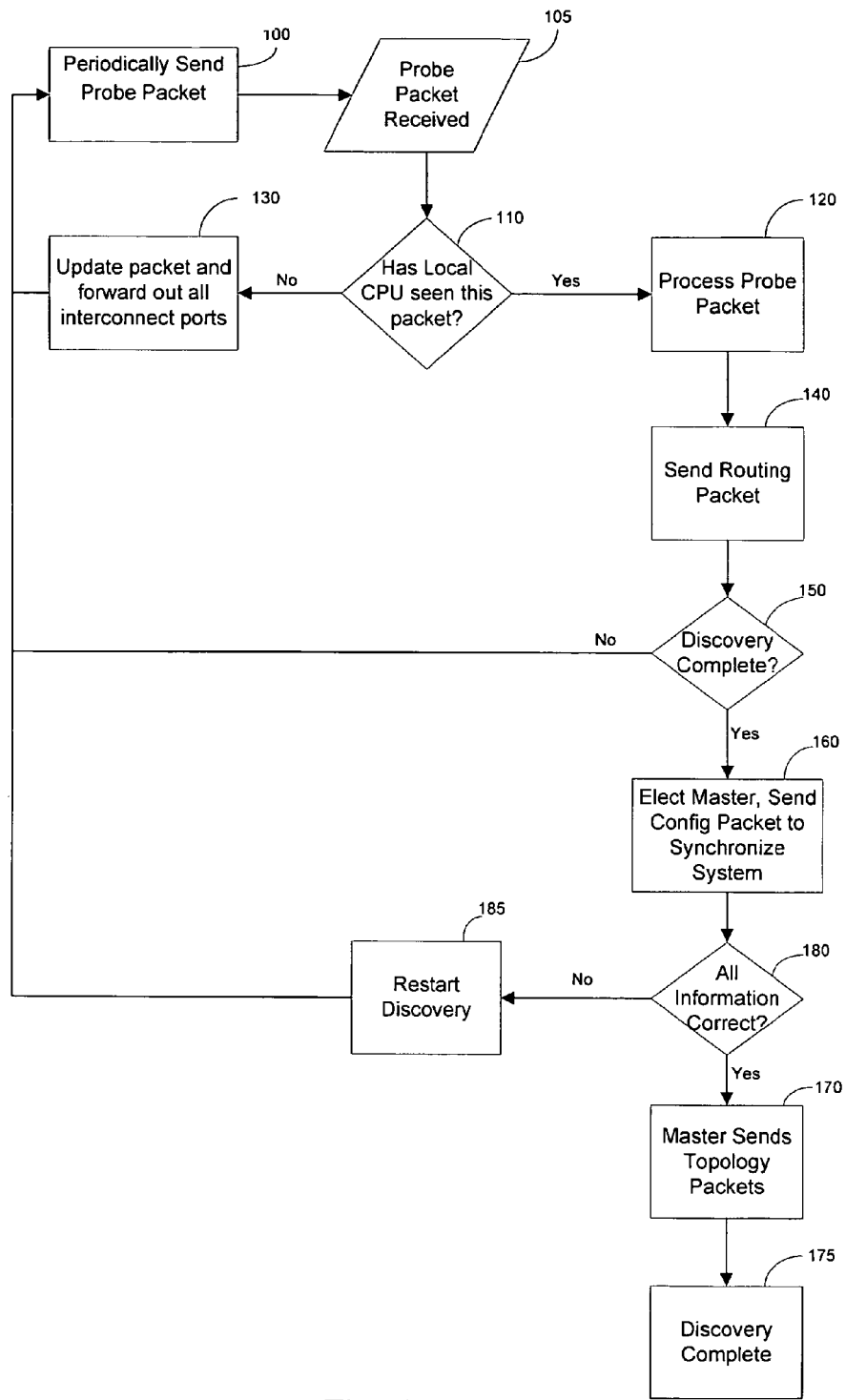
FIG. 1 illustrates a method according to one embodiment of the invention.

FIG. 1 illustrates a method according to one embodiment of the invention. Probe packets are sent out from a network switch to other network switches in the stack 100 via a stack port. The probe packets include at least a tag indicating the transmit port from which the probe packet was sent and the receive port at which the probe packet was received. The data portion of a probe packet may contain a list of entries with the following information: the identifying key of the CPU at this link (key), the index of the stack port on which the packet was received (rx_idx), and the index of the stack port on which the packet was transmitted (tx_idx).

A CPU in each network switch in the stack creates and updates a local database which maintains the information received from each packet which the CPU analyzes. Upon receiving a packet 105, the receiving CPU makes an entry for the sending key in its local database if one does not already exist. It then updates the receive information for the stack port on which the packet was received. The CPU of the receiving switch will then determine whether the switch has previously seen this specific packet 110. If it has (the CPU's own key appears on the list), then the CPU will analyze the data contained in the packet and update its local database accordingly 120. If it has not seen the packet previously, the CPU adds its own information to the end of the list, includes the new tagging information in the probe packet (i.e. transmit and receive ports), and sends the probe packet out all stack ports including the source port of the original packet 130.

Figure 3:
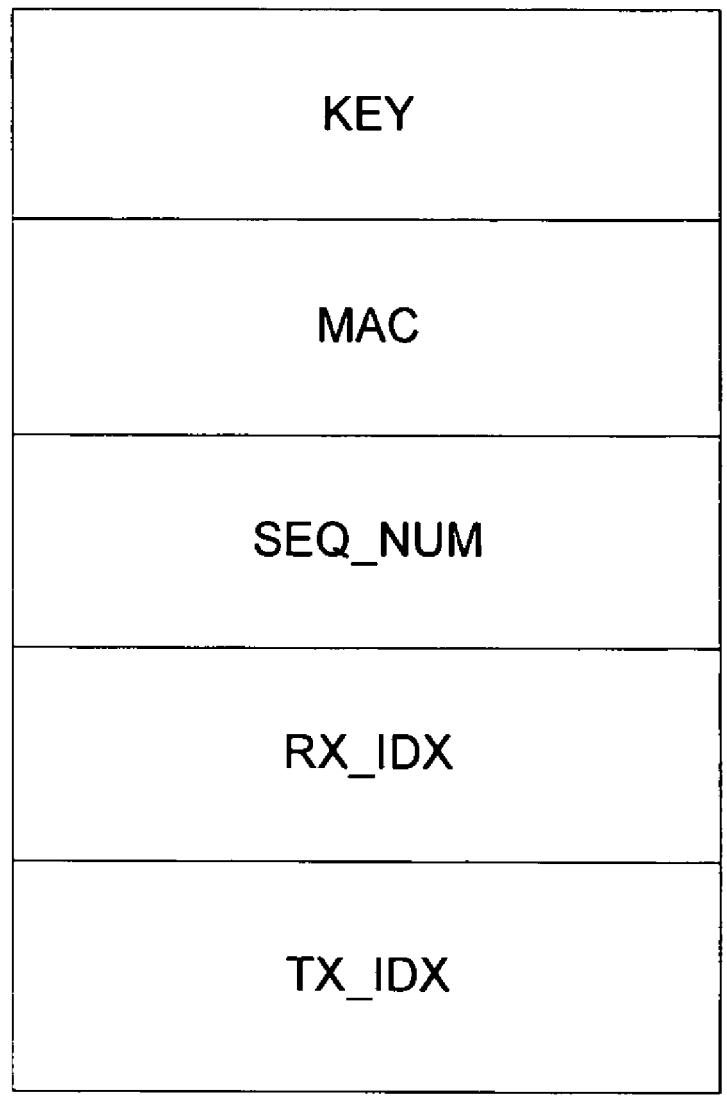
FIG. 3 illustrates a format of probe packet entries according to one embodiment of the invention.

FIG. 3 illustrates a format of the probe packet entries according to one embodiment of the invention. Specifically, the probe packet entry format may be as follows:

KEY—The unique key identifying the CPU;
MAC—The MAC address for this CPU;
SEQ_NUM—Discovery sequence number which is assigned on discovery start;
RX_IDX—Index of stack port on which this packet was received;
TX_IDX—Index of stack port on which this packet was transmitted.

Next, routing packets are sent from one switch to its neighboring switch 140. The routing packets contain all of the information in the local database of the switch that sends the routing packet. Thus, the routing packets serve to communicate the information contained in each local database to the other switches in the stack. The CPU of the switch receiving the routing packet will analyze the information contained in the routing packet and update its local database with that information. In this manner, the discovery information collected via the probe packets is propagated throughout the system.

Figure 4:
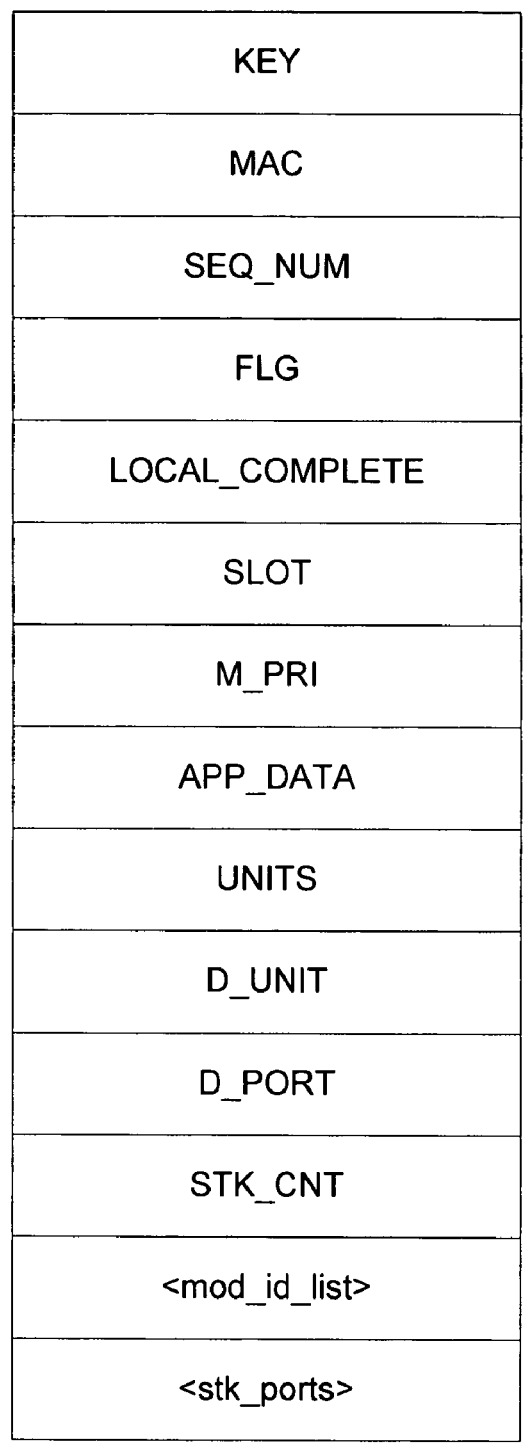
FIG. 4 illustrates a format of routing packet entries according to one embodiment of the invention

FIG. 4 illustrates a format of the routing packet entries according to an embodiment of the invention. The routing packet may include the following entries:

KEY—The unique key identifying the CPU;
MAC—This entry's MAC address;
SEQ_NUM—Discovery sequence number;
FLG—Flags;
LOCAL_COMPLETE—KEY knows it has a complete database;
SLOT—Slot ID;
M_PRI—Master priority;
APP_DATA—Application data;
UNITS—Number of switch devices controlled by this CPU;
D_UNIT—0-based local index of device for addressing CPU;
D_PORT—Destination port for addressing this CPU;
STK_CNT—How many stack port entries follow;
<stk_ports>--One entry per stack port.

The method further includes determining whether all of the configuration information is known to all switches in the stack 150. Each local database includes a first indicator for indicating that the local CPU has resolved the local stack port information. A second indicator is also included in each local database for indicating that the local CPU has confirmed that all other CPUs have resolved their local information. A third indicator is also provided in each local database for indicating that the local CPU has confirmed that every other CPU has also confirmed that the other CPUs have resolved their local information. If all of these indicators are positive, each switch has determined that all of the configuration information has been received and resolved by all of the other switches in the stack.

Next, one of the network switches is elected as a central authority, called a master 160. A master priority entry may be included in each database. The master may be elected by comparing the master priority entries of each switch. The switch which has the highest master priority entry will be selected as master. If more than one switch has the highest priority, then the local CPU with the lowest identifier is designated as the master. Configuration packets, containing the key of the master CPU, are sent by the master to each other network device in the system.

The master undertakes the analysis of the configuration information in the database. During the analysis, the master will determine how to avoid loops in the system, and will generate a map or path for every possible pair of connections. The master may undertake the analysis through, for example, graph analysis, loop detection, or path determination. The master will then send the result of the analysis, in topology packets, to all the other network switches in the stack 170. A topology packet is also looped back from the master to itself to allow local programming of devices on the master. The topology packet contains the final configuration information that all of the switches have resolved to use, and also signals the completion of the discovery process 175.

Figure 5:
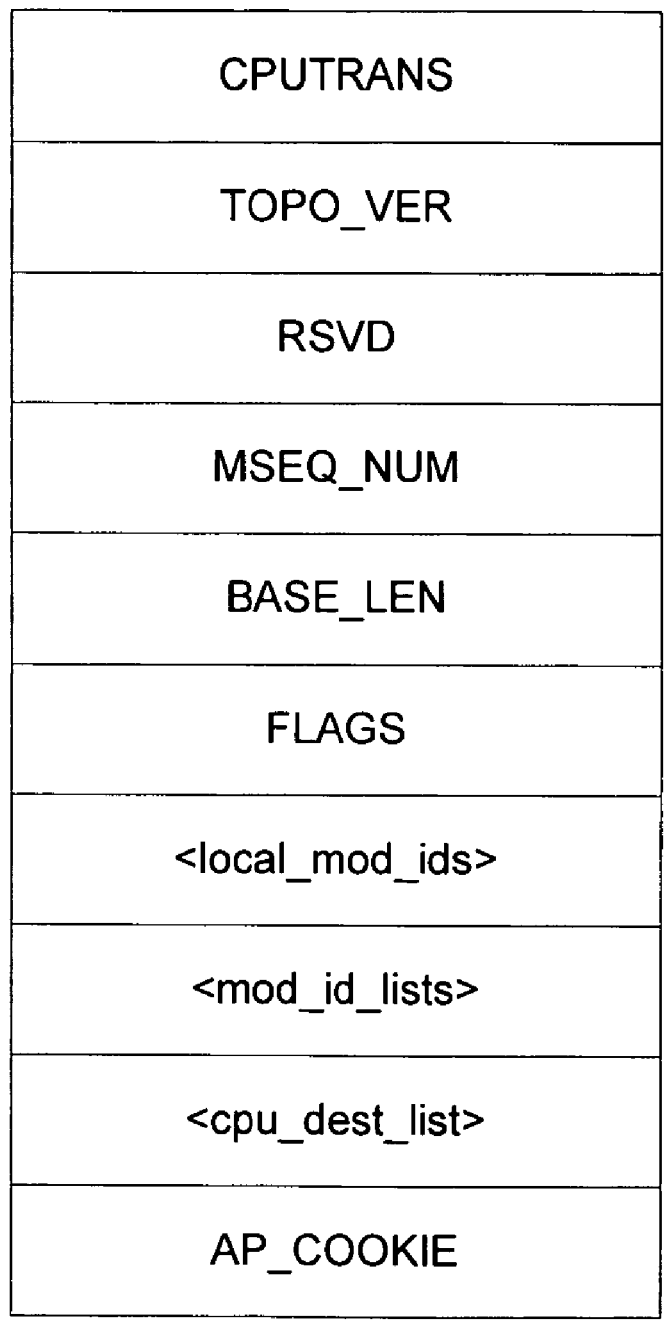
FIG. 5 illustrates a format of topology packet entries according to one embodiment of the invention.

FIG. 5 illustrates a format of the topology packet entries according to an embodiment of the invention. The topology packet may include the following entries:

CPUTRANS—Transport header;
TOPO_VER—Topology version number;
RSVD—Reserved byte;
MSEQ_NUM—Sequence number of discovery used by master;
BASE_LEN—Length in bytes of the packet from NUM_STK through AP_COOKIE. This is used for the comparison of topology packets;
FLAGS_flags;
<local-mod-ids>--List of base module IDs to use;
<mod-id-lists>--List of module IDs bound to each stack port;
<cpu-dest-list>--The destination mod ids to use per CPU;
AP_COOKIE—Cookie used by application. By default, it is used in detecting topology changes.

The system is synchronized such that all switches in the stack agree that the process is complete 180. Validation is made that the configuration information exchanged is the same across all of the switches. If any discrepancy is detected in any of the databases, a fault is triggered and the process is repeated 185. Additionally, every local database has a discovery sequence number. The sequence number is incremented whenever the CPU has detected a problem. Anytime a problem is detected, the CPU will re-start the process from the beginning. As discussed above, since the local database information is propagated throughout the system, all of the other network switches will also see that there is a problem and reset the process.

Thus, the method described above provides a way for dynamically determining or discovering the interconnections between a system of network switches. The information discovered during this process may include the following: (1) determining the number of CPUs in the system, each identified by a unique MAC address; (2) information about each CPU in the system, including the unique database key identifying the CPU, the number of switch devices controlled by the CPU, the total number of stack ports controlled by the CPU, the total number of module IDs required by all switch devices controlled by the CPU; (3) determining routes to each CPU in the system, including what port in a network device should a packet exit in order to reach a given CPU; (4) generating a map indicating the network device each stack port connects to, for transmit and receive independently; (5) determining the master network device; (6) locally significant CPU references; (7) locally significant device numbers for each switch device in the system; (8) global module ID numbers for each device that requires one; (9) determining the ports that need to be disabled in order to prevent loops from occurring in the system.

Figure 2:
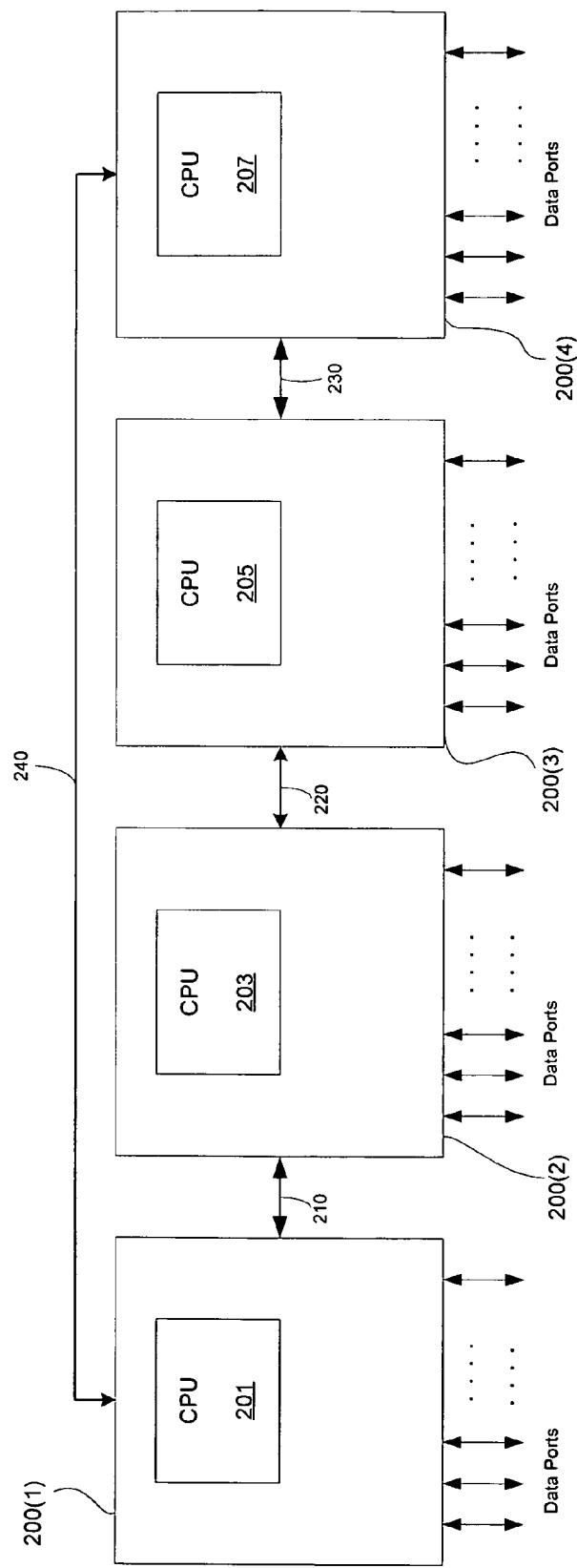
FIG. 2 illustrates a system according to one embodiment of the invention

FIG. 2 illustrates a system according to an embodiment of the present invention. The system includes a stack of network devices 200(1), 200(2), 200(3), 200(4). Four network devices are illustrated, however any number of network devices may be stacked in this configuration. Upon start-up, the system is configured in a manner that guarantees that information can travel from each network device to one of the adjacent or neighboring network devices. The network devices 200(1), 200(2), 200(3), 200(4) are connected to each other via stack ports 210, 220, 230, 240. Each of the network devices 200(1), 200(2), 200(3), 200(4) may include CPUs 201, 203, 205, 207. In addition to the stack ports 210, 220, 230, 240, the network device may include a plurality of data ports for transmitting and receiving data packets.

Upon start-up of the system, each of the network devices 200(1), 200(2), 200(3), 200(4) sends out a probe packet via the stack ports 210, 220, 230, 240 to the adjacent network devices. The probe packet contains a tag indicating the transmit and receive ports used by the probe packet. The CPU of a network device receiving a probe packet will determine whether it has previously seen the particular probe packet. If it has, then it will analyze the information contained in the packet and update a local database, maintained by each CPU, with the information extracted from the probe packet. If the CPU has not previously seen the packet, then it will update the tag of the probe packet and send it on to the next network device. Therefore, the tag of a probe packet according to an embodiment of the present invention may, for example, look like the following: CPU, $Tx_1$, $CPU_2$, $Rx_2$, $Tx_3$, . . . , $CPU_i$, $Rx_y$, $Tx_z$. According to this example, the probe packet was sent from $CPU_1$ on transmit port 1, received by $CPU_2$ on receive port 2, transmitted by $CPU_2$ on transmit port 3, received by $CPU_i$ on receive port y, and transmitted by $CPU_i$ on transmit port z.

Each of the network devices 200(1), 200(2), 200(3), 200(4) will then send out a routing packet via the stack ports 210, 220, 230, 240. The routing packets contain all of the information in the local database of the CPU of the network device that sends the routing packet. Thus, the routing packets serve to communicate the information contained in each local database to the other switches in the stack. The CPU of the switch receiving the routing packet will analyze the information contained in the routing packet and update its local database with that information. In this manner, the discovery information collected via the probe packets is propagated throughout the system.

One of the network devices in the system can be selected as a master network device. As discussed above, the master network device may be selected by comparing master priority entries in the databases or by comparing identifiers. Configuration packets, containing the key of the master CPU, are sent by the master to each other network device in the system.

The master network device analyzes the configuration information in its local database. As mentioned above, the master is responsible for determining how to avoid loops in the system, and will also generate a map or path for every possible pair of connections. The master network device will then send the result of the analysis, in topology packets, to all the other network switches in the stack. The topology packet contains the final configuration information that all of the switches have resolved to use, and also signals the completion of the discovery process.

Thus, in the manner described, the system of network devices is able to dynamically discover what the components of the system are and how they are interconnected.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of discovering interconnections between a plurality of network devices arranged in a stacked configuration, the method comprising:
    sending a first probe packet from a first network device to a next network device in the stacked configuration;
    receiving a second probe packet at the first network device from a previous network device in the stacked configuration;
    sending at least one routing packet from the first network device to the next network device, the at least one routing packet including configuration information from a local database included in the first network device; and
    confirming, by the first network device, that each of the other network devices of the plurality of network devices in the stacked configuration has received the configuration information.

2. The method of claim 1, wherein:
    the first probe packet includes a tag indicating a transmit port from which the first probe packet was transmitted and a receive port at which the first probe packet was received; and
    the second probe packet includes a tag indicating a transmit port from which the second probe packet was transmitted and a receive port at which the second probe packet was received.

3. The method of claim 1, further comprising:
    electing one of the plurality of network devices as a master network device; and
    sending, from the master network device to the other network devices of the plurality of network devices, at least one topology packet including final configuration information for the stacked configuration.

4. The method of claim 3, wherein electing one of the plurality of network devices as a master network device comprises sending at least one configuration packet from the master network device to the other network devices, the configuration packet including a key identifying the master network device.

5. The method of claim 3, further comprising:
    validating, at each network device, that the final configuration information received is consistent with the final configuration information received by the other network devices of the plurality of network devices.

6. The method of claim 1, further comprising determining, at each network device of the plurality of network devices, whether the first probe packet has been previously received.

7. The method of claim 6, wherein, when each network device determines that it has previously received the first probe packet, each network device will perform an analysis of the information contained in the first probe packet.

8. The method of claim 1, further comprising:
maintaining, in each network device, a database for storing information extracted from the at least one routing packet; and
updating, by each network device, its database with information from each of the at least one routing packets received.

9. The method of claim 8, wherein, for each network device, maintaining its database comprises maintaining its database including an entry for a discovery sequence number, wherein, when the discovery sequence number is incremented, a fault has been detected.

10. A network device comprising:
a first stack port configured to couple with a next network device; and
a second stack port configured to couple with a previous network device; and
a processor configured to:
send, to the next network device through the first stack port, a first probe packet and a routing packet;
receive, from the previous network device through the second stack port, a second probe packet and the routing packet; and
confirm that the previous network device and the next network device have received configuration information included in the routing packet.

11. The network device of claim 10, wherein the first probe packet and the second probe packet comprise respective tags indicating a respective transmit port from which the respective probe packet was transmitted and a respective receive port at which the respective probe packet was received.

12. The network device of claim 10, wherein the network device, the next network device and the previous network device form at least a portion of a stack of network devices.

13. The network device of claim 12, wherein the routing packet comprises configuration information for the stack of network devices.

14. The network device of claim 10, wherein:
one of the network device, the next network device and the previous network device is selected as a master network device; and
the master network device is configured to send a topology packet including final configuration information for a stacked network device configuration including the network device, the next network device and the previous network device.

15. The network device of claim 14, wherein the master network device is configured to send at least one configuration packet to the other network devices, the at least one configuration packet including a key identifying the master network device.

16. The network device of claim 10,
wherein each of the network device, the next network device and the previous network device is configured to maintain a respective database for storing information extracted from each of a plurality of received routing packets.

17. The network device of claim 16, wherein each respective database includes an entry for a discovery sequence number, and wherein the discovery sequence number is incremented when a fault is detected in a stacked network device configuration including the network device, the next network device and the previous network device.

18. A network device comprising:
first stack port means connecting a next network device; and
second stack port means connecting a previous network device;
processor means:
sending, through the first stack port means, a first probe packet and a routing packet to a next network device;
receiving, through the second stack port means, a second probe packet and the routing packet from a previous network device; and
confirming the next network device and the previous network device have received configuration information included in the routing packet.

19. The network device of claim 18, wherein:
the network device, the next network device and the previous network device form at least a portion of a stack of network devices;
one of the stack of network devices is selected as a master network device; and
the master network device is configured to send a topology packet including final configuration information for the stack of network devices.

20. The network device of claim 19, wherein the master network device is configured to send at least one configuration packet to the other network devices, the at least one configuration packet including a key identifying the master network device.

* * * * *

UNITED STATES PATENT AND TRADEMARK OFFICE
CERTIFICATE OF CORRECTION

PATENT NO. : 8,295,202 B2  Page 1 of 1
APPLICATION NO. : 12/684676
DATED : October 23, 2012
INVENTOR(S) : Brian Baird et al.

It is certified that error appears in the above-identified patent and that said Letters Patent is hereby corrected as shown below:

In column 7, line 16, in claim 10, after "device;" delete "and".

Signed and Sealed this
First Day of January, 2013

David J. Kappos
*Director of the United States Patent and Trademark Office*